United States Patent
Horiguchi et al.

(10) Patent No.: US 10,348,883 B2
(45) Date of Patent: Jul. 9, 2019

(54) CONTROL DEVICE, ELECTRONIC APPARATUS, CONTROL PROGRAM, AND STORAGE MEDIUM

(71) Applicant: SHARP KABUSHIKI KAISHA, Sakai, Osaka (JP)

(72) Inventors: Narimi Horiguchi, Sakai (JP); Takahiro Ohkawa, Sakai (JP); Kiyotaka Takizuka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 22 days.

(21) Appl. No.: 15/571,813

(22) PCT Filed: Aug. 31, 2016

(86) PCT No.: PCT/JP2016/075557
§ 371 (c)(1),
(2) Date: Nov. 3, 2017

(87) PCT Pub. No.: WO2017/056838
PCT Pub. Date: Apr. 6, 2017

(65) Prior Publication Data
US 2018/0352073 A1 Dec. 6, 2018

(30) Foreign Application Priority Data
Sep. 28, 2015 (JP) .................. 2015-190075

(51) Int. Cl.
*G06F 3/16* (2006.01)
*H04M 1/725* (2006.01)
(Continued)

(52) U.S. Cl.
CPC ........ *H04M 1/72569* (2013.01); *G06F 3/048* (2013.01); *G06F 3/16* (2013.01); *H04M 1/00* (2013.01); *H04M 1/72577* (2013.01)

(58) Field of Classification Search
CPC .. H04M 1/72569; H04M 1/72577; G06F 3/16
See application file for complete search history.

(56) References Cited

U.S. PATENT DOCUMENTS

2015/0172446 A1\* 6/2015 Aurongzeb ............... G06F 9/44
455/418
2015/0350885 A1\* 12/2015 Stanley-Marbell ..... H04W 8/22
455/418
(Continued)

FOREIGN PATENT DOCUMENTS

| JP | 2000-29661 A | 1/2000 |
| JP | 2014-182656 A | 9/2014 |
| JP | 2014-191544 A | 10/2014 |

*Primary Examiner* — Chuong A Ngo
(74) *Attorney, Agent, or Firm* — ScienBiziP, P.C.

(57) ABSTRACT

Provided is, for example, a control device which prevents notification of information from being provided to a user in a situation for which the user considers it inappropriate to receive notification of information. A control device (1) includes a motion detecting section (22), a brightness detecting section (21), and a notification permission determining section (35). In a case where the motion detecting section (22) detects that a predetermined motion is being given to an electronic apparatus (100) which includes the control device (1), the notification permission determining section (35) determines that notification of information is not to be provided to the user.

9 Claims, 5 Drawing Sheets

(51) Int. Cl.
    *G06F 3/048*    (2013.01)
    *H04M 1/00*    (2006.01)

(56) References Cited

U.S. PATENT DOCUMENTS

2016/0057277 A1* 2/2016 Ji .................. H04M 19/047
                                                    455/418
2016/0092024 A1  3/2016 Nagata

* cited by examiner

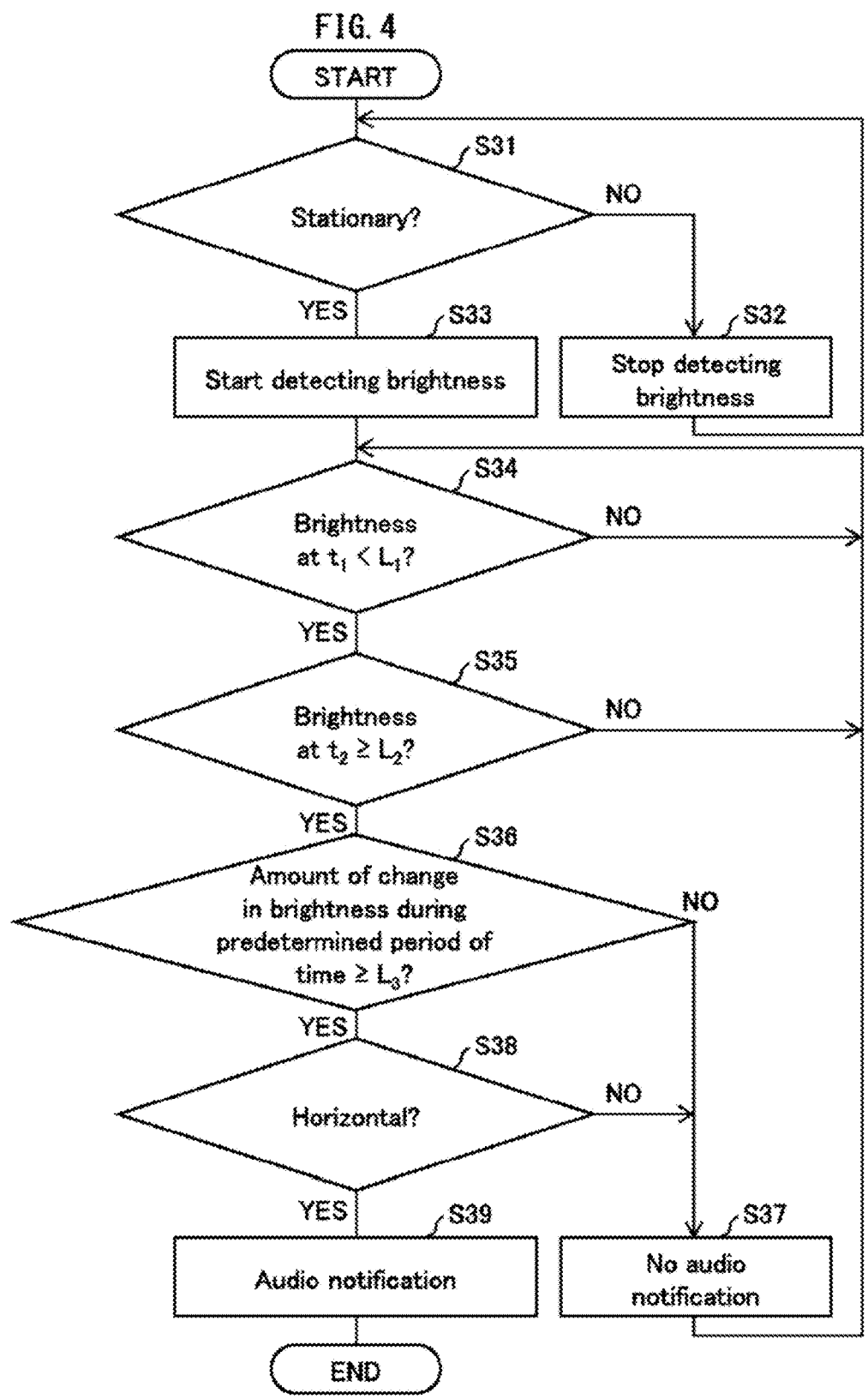

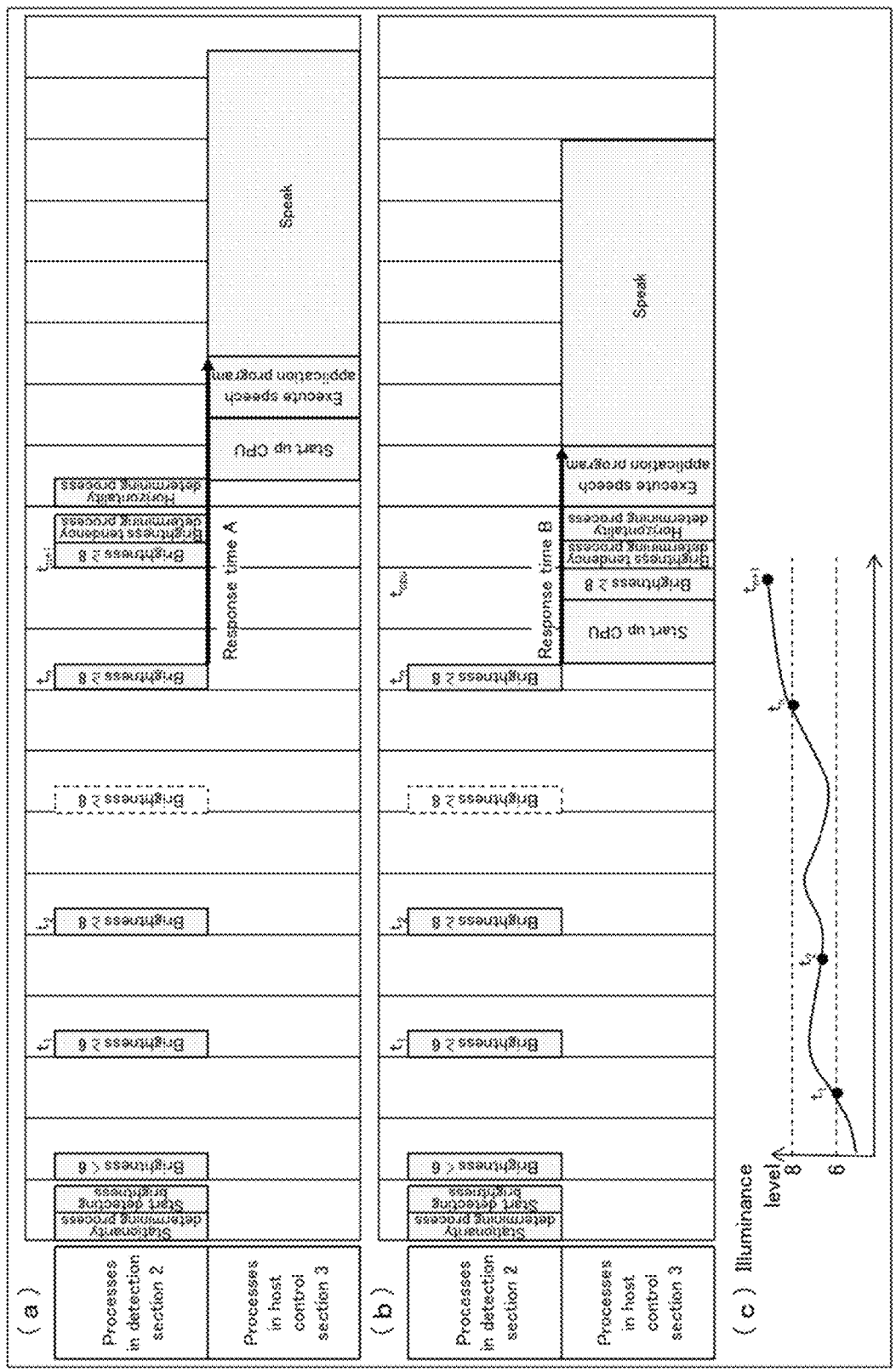

CONTROL DEVICE, ELECTRONIC APPARATUS, CONTROL PROGRAM, AND STORAGE MEDIUM

TECHNICAL FIELD

The present invention relates to a control device which controls providing visual or audio notification of information to a user.

BACKGROUND ART

There has been known a conventional technique for limiting a function of a mobile phone by use of an acceleration sensor and an illuminance sensor which are included in the mobile phone. For example, Patent Literature 1 discloses a technique for, in both a case where a dynamic acceleration generated in a mobile phone is greater than a predetermined value and a case where a brightness in an area surrounding the mobile phone has been decreased by much larger than a predetermined amount, providing, in a touch panel included in the mobile phone, a restricted region which restricts acceptance of a touch operation.

CITATION LIST

Patent Literature

[Patent Literature 1]
Japanese Patent Application Publication Tokukaihei No. 2014-191544 (Publication date: Oct. 6, 2014)
[Patent Literature 2]
Japanese Patent Application Publication Tokukaihei No. 2014-182656 (Publication date: Sep. 29, 2014)
[Patent Literature 3]
Japanese Patent Application Publication Tokukaihei No. 2000-29661 (Publication date: Jan. 28, 2000)

SUMMARY OF INVENTION

Technical Problem

The technique disclosed in Patent Literature 1, however, is not a technique for controlling audio made by a mobile phone, but the technique for providing, in a touch panel, a restricted region which restricts acceptance of a touch operation for the purpose of preventing user's erroneous operations. Unfortunately, the technique of Patent Literature 1 cannot control audio made by a mobile phone. The present invention was made in view of the problem, and an object of the present invention is to provide, for example, a control device which prevents notification of information from being provided to a user in a situation for which the user considers it inappropriate to receive notification of information.

The situation for which the user considers it inappropriate to receive notification of information is, for example, (i) a situation when the user is sleeping and would be annoyed by audio notification or (ii) a situation when the user turns on a light in a conference room at his/her workplace. Especially, for a case where audio notification of information is provided to a user, the user's private information can become known to more people and a person in a place further away from the user, as compared to a case where visual notification of the information is provided. It is therefore more important to prevent audio notification of the information, from the viewpoint of preventing the leakage of privacy.

Solution to Problem

In order to attain the object, a control device in accordance with an aspect of the present invention is configured to be a control device which controls providing visual or audio notification of information to a user, including: a motion detecting section which detects whether or not a predetermined motion is being given to an electronic apparatus which includes the control device; a brightness detecting section which detects whether or not a brightness in an area around the electronic apparatus is equal to or higher than a predetermined brightness; and a notification permission determining section which determines, in a case where the brightness detecting section detects that the brightness in the area around the electronic apparatus is equal to or higher than the predetermined brightness, whether or not to permit providing notification of the information to the user, in a case where the motion detecting section detects that the predetermined motion is being given to the electronic apparatus, the notification permission determining section determining that notification of the information is not to be provided to the user.

Advantageous Effects of Invention

The aspect of the present invention makes it possible to prevent notification of information from being provided to a user in a situation for which the user considers it inappropriate to receive notification of information. The aspect also makes it possible to prevent private information of the user, such as his/her liking and his/her attribute, from becoming known to a person around the user, that is, to prevent the leakage of the user's privacy.

BRIEF DESCRIPTION OF DRAWINGS

FIG. 4 is a flow chart illustrating processes carried out in a control device in accordance with Embodiment 3 of the present invention.
(a) and (b) of FIG. 5 each are a view illustrating an example of a timing at which a host control section included in the control device is activated. (c) of FIG. 5 is a view illustrating an example of a change in brightness over time.

DESCRIPTION OF EMBODIMENTS

The following description will discuss embodiments of the present invention in detail. Note that, for convenience of explanation, members having functions identical to those of respective members described in the embodiments are given respectively identical reference signs, and descriptions of such members are omitted as appropriate.

Embodiment 1

[Main Components of Electronic Apparatus 100]

Figure 1:
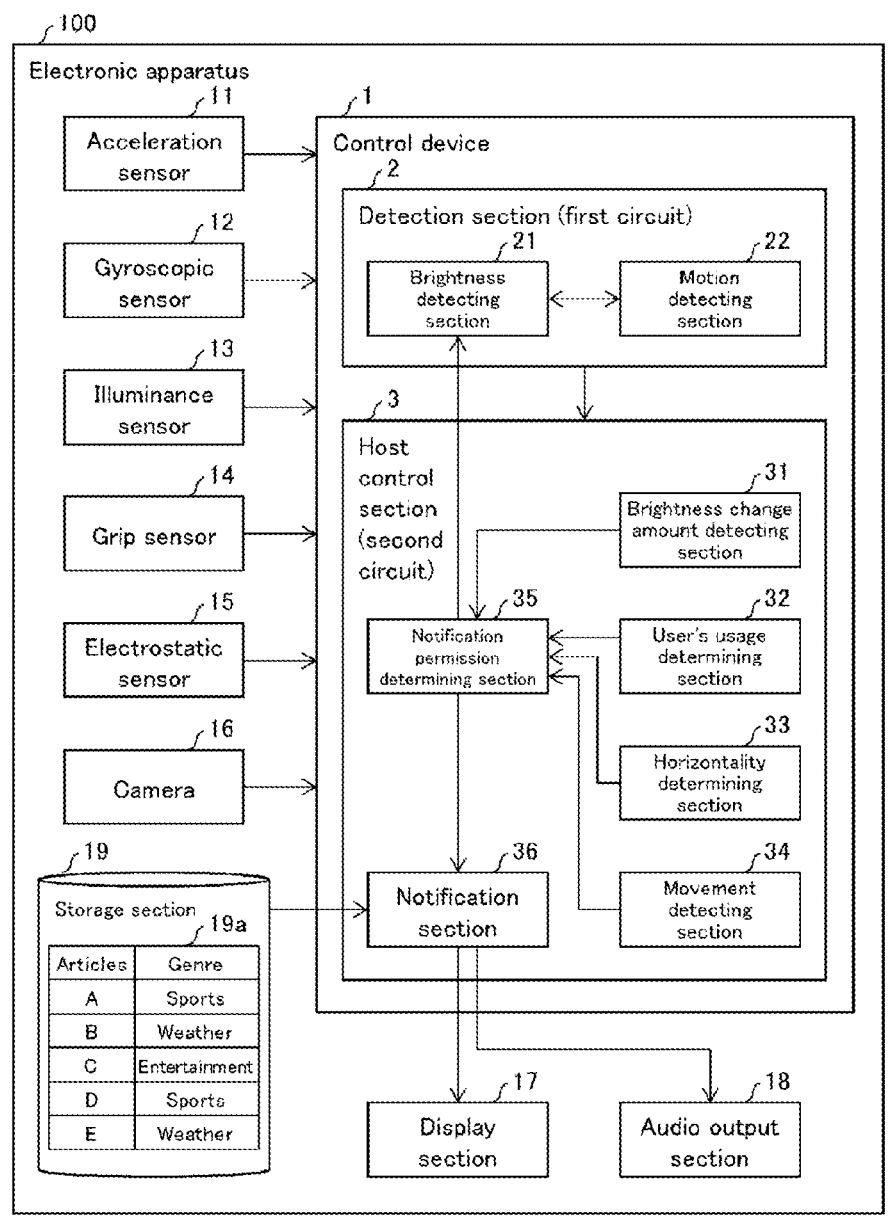
FIG. 1 is a block diagram illustrating main components of an electronic apparatus in accordance with an embodiment of the present invention.

FIG. 1 is a block diagram illustrating main components of an electronic apparatus 100 in accordance with Embodiment 1 of the present invention. The electronic apparatus 100 is configured to provide visual or audio notification of information to a user. Examples of the electronic apparatus 100 include (i) mobile phones including a smart phone and (ii) mobile electronic apparatuses such as a notebook-sized personal computer. The electronic apparatus 100 includes a speech application program for providing visual or audio notification of information to a user. The speech application program is executed in accordance with a surrounding environment of the electronic apparatus 100 (in response to a change in brightness in an area around the electronic apparatus 100) to allow the electronic apparatus 100 to speak. For example, when a user opens a curtain in his/her bedroom in a state where the electronic apparatus 100 is placed beside a bed, the electronic apparatus 100 says "Good morning".

As illustrated in FIG. 1, the electronic apparatus 100 includes a control device 1, various sensors 11 through 16, a display section 17, an audio output section 18, and a storage section 19. The control device 1 is configured to control, on the basis of values obtained by detections performed by the various sensors 11 through 16, providing visual or audio notification of information to a user.

The various sensors are, for example, an acceleration sensor 11, a gyroscopic sensor 12, an illuminance sensor 13, a grip sensor 14, an electrostatic sensor 15, and a camera 16, respectively. These sensors supply, to the control device 1, results of detections performed by these sensors. The acceleration sensor 11 needs only be a three-axis or six-axis acceleration sensor included in a general mobile electronic apparatus. The acceleration sensor 11 is configured to detect an acceleration generated in the electronic apparatus 100. The gyroscopic sensor 12 is configured to detect a direction in which the electronic apparatus 100 faces, and an angular velocity generated in the electronic apparatus 100. The illuminance sensor 13 is configured to detect a degree of brightness (an illuminance) in an area surrounding the electronic apparatus 100. The grip sensor 14 is configured to detect a user's gripping of the electronic apparatus 100. The electrostatic sensor 15 is configured to detect a user's touch operation performed on a display screen of the display section 17. The camera 16 is configured to (i) capture an image of the area surrounding the electronic apparatus 100 and (ii) detects that an image of a user is included in the captured image.

The display section 17 is, for example, a liquid crystal display, a plasma display, or an organic EL display. The display section 17 is configured to display an image which has been determined by a notification section 36 included in the control device 1. The audio output section 18 is, for example, a speaker. The audio output section 18 is configured to output an audio which has been determined by the notification section 36.

The storage section 19 is a storage device which stores various pieces of data to be used by the control device 1. The storage section 19 stores, for example, speech information 19a to be used when the speech application program is executed. The speech information 19a is information of which visual or audio notification is to be provided to a user. The speech information 19a includes articles to be notified which are arranged by genre.

The control device 1 includes a detection section 2 and a host control section 3. The detection section 2 and the host control section 3 are constituted by respective different circuits (a first circuit and a second circuit, respectively).

This makes it possible to control supplying electric power to the detection section 2 and supplying electric power to the host control section 3 independently from each other. The detection section 2 is capable of carrying out processing with less electric power, as compared to the host control section 3. The detection section 2 is, for example, a so-called sensor hub. The detection section 2 and the host control section 3 can be put into an activated state or a sleep state (deactivated state) independently from each other. For example, while the host control section 3 is in the sleep state, the detection section 2 is in the activated state, and vice versa.

The detection section 2 is configured to periodically collect pieces of information supplied from the various sensors 11 through 15. The detection section 2 includes, for example, a brightness detecting section 21 and a motion detecting section 22. The brightness detecting section 21 periodically detects, on the basis of a detection result supplied from the illuminance sensor 13, whether or not the brightness in the area around the electronic apparatus 100 is equal to or higher than a predetermined brightness. For example, in a case where a value obtained by detection performed by the illuminance sensor 13 has changed from a level below a predetermined illuminance level of 6 to a level equal to or higher than a predetermined illuminance level of 8, the brightness detecting section 21 detects that the brightness in the area around the electronic apparatus 100 is equal to or higher than the predetermined brightness.

The motion detecting section 22 detects, on the basis of a detection result supplied from the acceleration sensor 11, whether or not a predetermined motion is being given to the electronic apparatus 100. The predetermined motion is, for example, (i) a motion made by the electronic apparatus 100 when a user takes it out of a bag or a pocket or (ii) a motion made by the electronic apparatus 100 when a user lifts up the electronic apparatus 10 which is in a stationary state. In a case where values obtained by detections performed by the acceleration sensor 11 and other sensor(s) are equal to or higher than predetermined values, the motion detecting section 22 detects that the predetermined motion is being given to the electronic apparatus 100. The motion detecting section 22 can alternatively detect, on the basis of not only the detection result supplied from the acceleration sensor 11 but also a detection result(s) supplied from other sensor(s) such as the gyroscopic sensor 12, whether or not the predetermined motion is being given to the electronic apparatus 100.

The host control section 3 includes a brightness change amount detecting section 31, a user's usage determining section 32, a horizontality determining section 33, a movement detecting section 34, a notification permission determining section 35, and the notification section 36. The host control section 3 is constituted by, for example, a Central Processing Unit (CPU), a Read Only Memory (ROM), and a Random Access Memory (RAM). The CPU executes a program stored in the ROM, the RAM or the like. This controls each of the sections of the electronic apparatus 100.

Note that the host control section 3 does not need to be in the activated state at all times but can be in the sleep state as needed so that the electronic apparatus 100 reduces power consumption. The host control section 3 in the sleep state can return to the activated state in a case where (i) the brightness detecting section 21 detects that the brightness in the area around the electronic apparatus 100 is equal to or higher than the predetermined brightness and (ii) the motion detecting section 22 detects that the predetermined motion is not being given to the electronic apparatus 100.

In a case where the brightness detecting section 21 detects that the brightness in the area around the electronic apparatus 100 is equal to or higher than the predetermined brightness, the brightness change amount detecting section 31 detects, on the basis of a detection result supplied from the illuminance sensor 13, an amount of change in the brightness in the area around the electronic apparatus 100 during a predetermined period of time. The predetermined period of time may be, for example, one cycle of detection performed by the brightness detecting section 21, or a given fixed value.

The user's usage determining section 32 determines, on the basis of detection results supplied from the various sensors 11 through 15, whether or not the electronic apparatus 100 is being used by a user. For example, in a case where the electrostatic sensor 15 detects a touch operation performed by a user, the user's usage determining section 32 determines that the electronic apparatus 100 is being used by the user. Note that the touch operation detected by the electrostatic sensor 15 is a touch operation performed by a user on the display screen of the display section 17 with the user's intention to operate the electronic apparatus 100. This touch operation is distinguished from a mere user's touch performed on the display screen of the display section 17 with no user's intention to operate the electronic apparatus 100.

The user's usage determining section 32 also determines that the electronic apparatus 100 is being used by a user, for example, in a case where the grip sensor 14 detects a user's gripping of the electronic apparatus 100. Note that the user's gripping detected by the grip sensor 14 includes a mere user's gripping of the electronic apparatus 100.

The user's usage determining section 32 also determines that the electronic apparatus 100 is being used by a user, for example, in a case where the camera 16 detects that the user exists in an area surrounding the electronic apparatus 100. More specifically, the user's usage determining section 32 analyzes an image captured by the camera 16 to determine whether or not a user is viewing the display screen of the display section 17. In a case where the user's usage determining section 32 determines that the user is viewing the display screen of the display section 17, the user's usage determining section 32 may determine that the electronic apparatus 100 is being used by the user. In a case where the display screen of the display section 17 is in a locked state (a state where the electronic apparatus 100 accepts no input operation), the user's usage determining section 32 determines that the electronic apparatus 100 in the locked state is being used by a user.

The horizontality determining section 33 determines, on the basis of detection results supplied from the acceleration sensor 11 and the gyroscopic sensor 12, whether or not the electronic apparatus 100 is being placed in a horizontal position. Note here that "is being placed in a horizontal position" means, for example, the electronic apparatus 100 is being placed on a stand such as a desk, and the display screen of the display section 17 is parallel to an upper surface of the desk.

The movement detecting section 34 detects, on the basis of detection results supplied from the acceleration sensor 11 and the gyroscopic sensor 12, that a user is moving by a means of transportation which the user uses to move. The means of transportation is, for example, walk, train, bus, bicycle, private car, ship, or airplane.

In a case where the brightness detecting section 21 detects that the brightness in the area around the electronic apparatus 100 is equal to or higher than the predetermined brightness, the notification permission determining section 35 determines whether or not to permit providing audio notification of information to a user. Note that, in this case, the notification permission determining section 35 can also determine that visual notification of the information is not to be provided to the user either. For example, in a case where the motion detecting section 22 detects that the predetermined motion is being given to the electronic apparatus 100, the notification permission determining section 35 determines that audio notification of the information is not to be provided to the user. The notification permission determining section 35 also determines that audio notification of the information is not to be provided to the user in a case where the user's usage determining section 32 determines that the electronic apparatus 100 is being used by the user. The notification permission determining section 35 also determines that audio notification of the information is not to be provided to the user in a case where an amount of change detected by the brightness change amount detecting section 31 is less than a predetermined amount. The notification permission determining section 35 also determines that audio notification of the information is not to be provided to the user in a case where the horizontality determining section 33 determines that the electronic apparatus 100 is not being placed in a horizontal position. The notification permission determining section 35 also determines that audio notification of the information is not to be provided to the user in a case where the movement detecting section 34 detects that the user is moving by the means of transportation.

The notification section 36 (i) selects, from among the speech information 19a stored in the storage section 19, the information of which notification is to be provided to the user, (ii) causes the audio output section 18 to output the selected information in the form of audio, and (iii) causes the display screen of the display section 17 to display the selected information in the form of an image or characters.

[Operation Example of Control Device 1]

Figure 2:
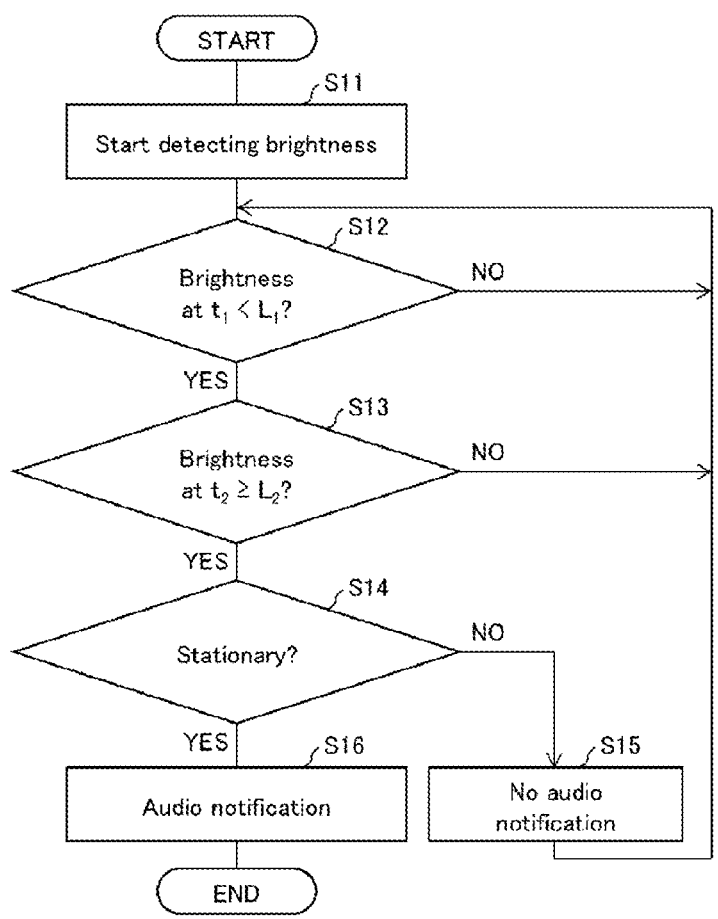
FIG. 2 is a flow chart illustrating processes carried out in a control device in accordance with Embodiment 1 of the present invention.

FIG. 2 is a flow chart illustrating processes carried out in the control device 1 in accordance with Embodiment 1. In Embodiment 1, after the brightness detecting section 21 carries out a detection process, the motion detecting section carries out a detection process. Thereafter, the notification permission determining section 35 determines whether or not to permit providing audio notification of the information to a user. The control device 1 in accordance with Embodiment 1 can therefore be configured not to include any of the following sections illustrated in FIG. 1: the brightness change amount detecting section 31; the user's usage determining section 32; the horizontality determining section 33; and the movement detecting section 34.

As illustrated in FIG. 2, first, the illuminance sensor 13 detects the degree of the brightness in the area surrounding the electronic apparatus 100 over time, and the brightness detecting section 21 starts a detection by determining, on the basis of a detection result supplied from the illuminance sensor 13, whether or not the brightness in the area around the electronic apparatus 100 is equal to or higher than the predetermined brightness (S11). Thereafter, the brightness detecting section 21 determines whether or not the brightness detected at t1 by the illuminance sensor 13 is below a predetermined illuminance level L1 (e.g., L1=6) (S12). Note that the predetermined illuminance level L1 is a determination reference value indicative of a predetermined darkness.

In a case where the brightness detecting section 21 determines that the brightness at t1 is below the predetermined illuminance level L1 (YES in S12), the brightness detecting section 21 determines whether or not the brightness detected at t2 by the illuminance sensor 13 is at or above a predetermined illuminance level L2 (e.g., L2=8) (S13). Note that the predetermined illuminance level L2 is a determination reference value indicative of being sufficiently bright, and is larger in value than the illuminance level L1 indicative of the predetermined darkness. Note also that the brightness at t2 shows the latest detection result of the brightness detected in a predetermined period of time after t1 by the illuminance sensor 13.

In a case where the brightness detecting section 21 determines that the brightness at t1 is below the predetermined illuminance level L1 (YES in S12) and the brightness at t2 is at or above the predetermined illuminance level L2 (YES in S13), the brightness detecting section 21 detects that the brightness in the area around the electronic apparatus 100 is equal to or higher than the predetermined brightness. Thereafter, the motion detecting section 22 detects whether or not the predetermined motion is being given to the electronic apparatus 100 (S14).

In a case where the motion detecting section 22 detects that the predetermined motion is being given to the electronic apparatus 100 (NO in S14), that is, the motion detecting section 22 detects that the electronic apparatus 100 is not stationary, the notification permission determining section 35 determines that audio notification of information is not to be provided to a user (S15). Note that in S15, the notification permission determining section 35 can also determine that visual notification of the information is not to be provided to the user either. After S15, the process in S12 and subsequent processes are repeated.

On the other hand, in a case of NO in S12 or a case of NO in S13, the process in S12 and the subsequent processes are repeated. In a case of YES in S14, that is, in a case where the motion detecting section 22 detects that the electronic apparatus 100 is stationary, the notification permission determining section 35 determines that audio notification of the information is to be provided to the user (S16). Thereafter, the notification section 36 (i) selects, from among the speech information 19a stored in the storage section 19, the information of which notification is to be provided to the user, (ii) causes the audio output section 18 to output the selected information in the form of audio, and (iii) causes the display screen of the display section 17 to display the selected information.

Thus, in a case where the predetermined motion is being given to the electronic apparatus 100, the electronic apparatus 10 does not notify the user of the information via audio even in a state where the brightness in the area around the electronic apparatus 100 is equal to or higher than the predetermined brightness. The case where the predetermined motion is being given to the electronic apparatus 100 is a situation where the user does not want to be notified of the information via audio. Examples of such a situation include (i) a situation where the user takes the electronic apparatus 100 out of a bag or a pocket, (ii) a situation where the user turns right side up the electronic apparatus 100 which has been placed with the display screen (the display section 17), which displays information such as an image, facing downward, and (iii) a situation where the user lifts up the electronic apparatus 100 which is placed on a given place. The control device 1 thus can prevent audio notification of the information from being provided to the user in a situation for which the user considers it inappropriate to receive audio notification of information.

Examples of the situation for which the user considers it inappropriate to receive audio notification of information include (i) a situation when the user is sleeping and would be annoyed by audio notification and (ii) a situation when the user turns on a light in a conference room at his/her workplace. Since it is possible to prevent audio notification of the information from being provided to the user in the latter situation, it is possible to prevent private information of the user, such as his/her liking and his/her attribute, from becoming known to a person around the user, that is, it is possible to prevent the leakage of the user's privacy. Especially, for the case where audio notification of the information is provided, the user's private information can become known to more people and a person in a place further away from the user, as compared to the case where visual notification of the information is provided. It is therefore more important to prevent audio notification of the information, from the viewpoint of preventing the leakage of privacy.

Embodiment 2

Figure 3:
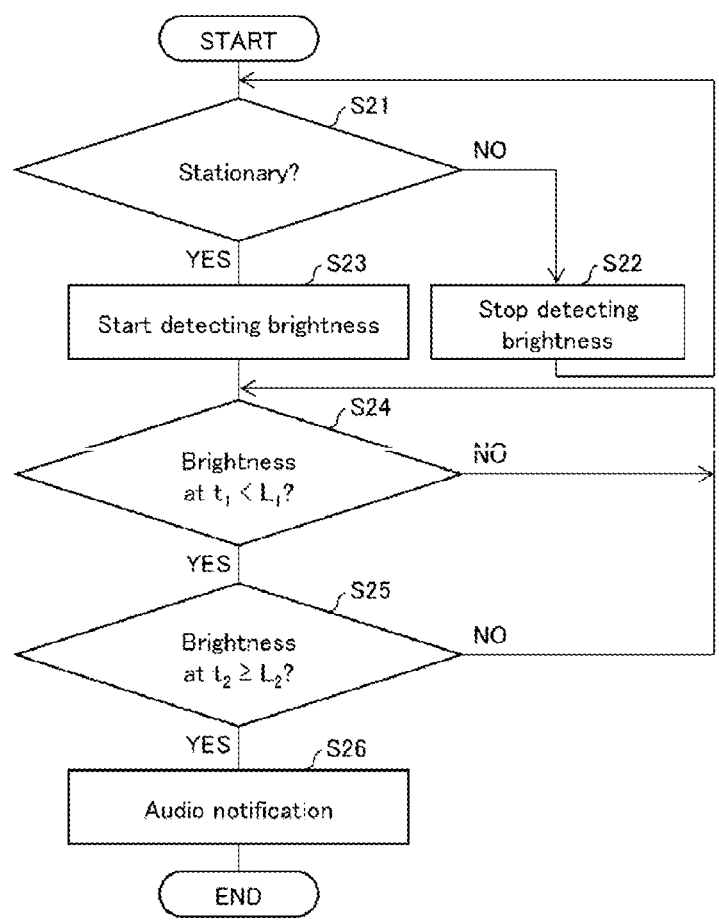
FIG. 3 is a flow chart illustrating processes carried out in a control device in accordance with Embodiment 2 of the present invention.

FIG. 3 is a flow chart illustrating processes carried out in a control device 1 in accordance with Embodiment 2. In Embodiment 2, after a motion detecting section 22 carries out a detection process, a brightness detecting section 21 carries out a detection process. Thereafter, a notification permission determining section 35 determines whether or not to permit providing audio notification of information to a user. Similar to the control device 1 in accordance with Embodiment 1, therefore, the control device 1 in accordance with Embodiment 2 can be configured not to include any of the following sections illustrated in FIG. 1: the brightness change amount detecting section 31; the user's usage determining section 32; the horizontality determining section 33; and the movement detecting section 34. Note that the brightness detecting section 21 in Embodiment 2 is assumed to periodically carry out the detection process, as described in Embodiment 1.

As illustrated in FIG. 3, first, the motion detecting section 22 detects whether or not a predetermined motion is being given to an electronic apparatus 100 (S21). In a case where the motion detecting section 22 detects that the predetermined motion is being given to the electronic apparatus 100 (NO in S21), that is, the motion detecting section 22 detects that the electronic apparatus 100 is not stationary, the notification permission determining section 35 (i) determines that audio notification of information is not to be provided to a user, and (ii) causes the brightness detecting section 21 to stop carrying out the detection process (S22). Note that in S22, an illuminance sensor 13 can stop detecting a brightness. After S22, the process in S21 and subsequent process(es) are repeated.

On the other hand, in a case where the motion detecting section 22 detects that the predetermined motion is not being given to the electronic apparatus 100 (YES in S21), that is, the motion detecting section 22 detects that the electronic apparatus 100 is stationary, the notification permission determining section 35 (i) determines that audio notification of information is to be provided to the user, and (ii) causes the brightness detecting section 21 to start carrying out the detection process (S23). Note that in a case where the brightness detection to be made by the illuminance sensor 13 has been stopped in S22, the brightness detection to be made by the illuminance sensor 13 is started in S23.

After S23, the brightness detecting section 21 determines whether or not the brightness detected at t1 by the illuminance sensor 13 is below a predetermined illuminance level L1 (e.g., L1=6) (S24). In a case where the brightness detecting section 21 determines that the brightness at t1 is below the predetermined illuminance level L1 (YES in S24), the brightness detecting section 21 determines whether or not the brightness detected at t2 by the illuminance sensor 13 is at or above a predetermined illuminance level L2 (e.g., L2=8) (S25).

In a case where the brightness detecting section 21 determines that the brightness at t1 is below the predetermined illuminance level L1 (YES in S24) and the brightness at t2 is at or above the predetermined illuminance level L2 (YES in S25), the brightness detecting section 21 detects that the brightness in an area around the electronic apparatus 100 is equal to or higher than a predetermined brightness. Thereafter, the notification permission determining section 35 determines that audio notification of the information is to be provided to the user (S26). After S26, a notification section 36 (i) selects, from among speech information 19a stored in a storage section 19, the information of which notification is to be provided to the user, (ii) causes an audio output section 18 to output the selected information in the form of audio, and (iii) causes a display screen of a display section 17 to display the selected information. Note that in a case of NO in S24 or a case of NO in S25, the process in S24 and subsequent process(es) are repeated.

Thus, while the motion detecting section 22 detects that the predetermined motion is being given to the electronic apparatus 100, the notification permission determining section 35 (i) determines that audio notification of the information is not to be provided to the user, and (ii) causes the brightness detecting section 21 to stop carrying out the detection process. For example, in a case where the user takes the electronic apparatus 100 out of a bag or a pocket, the motion detecting section 22 detects that the predetermined motion is being given to the electronic apparatus 100, and the notification permission determining section 35 determines that audio notification of the information is not to be provided to the user, and then causes the brightness detecting section 21 to stop carrying out the detection process. Once the brightness detecting section 21 stops carrying out the detection process, the notification permission determining section 35 does not need to determine whether or not to permit providing audio notification of the information to the user. Accordingly, the notification permission determining section 35 does not determine that audio notification of the information is to be provided to the user. Consequently, the control device 1 can prevent audio notification of the information from being provided to the user in a situation for which the user considers it inappropriate to receive audio notification of information.

Embodiment 3

FIG. 4 is a flow chart illustrating processes carried out in a control device 1 in accordance with Embodiment 3. In Embodiment 3 carried out are (i) a process of determining an amount of change in brightness during a predetermined period of time (S36 in FIG. 4 to be later described) and (ii) a horizontality determining process (S38 in FIG. 4), in addition to determination processes (S21 through S25 in FIG. 3) which have been described in Embodiment 2. The control device 1 in accordance with Embodiment 3 is therefore configured such that the control device 1 in accordance with Embodiment 2 further includes the brightness change amount detecting section 31 and the horizontality determining section 33 which are illustrated in FIG. 1. Note that S31 through S35 illustrated in FIG. 4 are the same as S21 through S25 illustrated in FIG. 3, and therefore descriptions of S31 through S35 are omitted in Embodiment 3.

As illustrated in FIG. 4, in a case where a brightness detecting section 21 determines that a brightness detected at t1 by an illuminance sensor 13 is below a predetermined illuminance level L1 (YES in S34) and a brightness detected at t2 by the illuminance sensor 13 is at or above a predetermined illuminance level L2 (YES in S35), the brightness detecting section 21 detects that a brightness in an area around an electronic apparatus 100 is equal to or higher than a predetermined brightness. Thereafter, the brightness change amount detecting section 31 detects an amount of change in the brightness in the area around the electronic apparatus 100 during a predetermined period of time, and determines whether or not the detected amount of change in the brightness is not less than a predetermined amount L3 (S36). The predetermined amount L3 is a determination reference value which indicates that the area around the electronic apparatus 100 has become quickly bright. The predetermined amount L3 can be set to a given specific numerical value.

In a case where the brightness change amount detecting section 31 determines that the detected amount of change in the brightness is less than the predetermined amount L3 (NO in S36), a notification permission determining section 35 determines that audio notification of information is not to be provided to a user (S37). Note that in S37, the notification permission determining section 35 can also determine that visual notification of the information is not to be provided to the user either. After S37, the process in S34 and subsequent process(es) are repeated.

Meanwhile, in a case of YES in S35, the horizontality determining section 33 determines whether or not the electronic apparatus 100 is being placed in a horizontal position (S38). In a case where the horizontality determining section 33 determines that the electronic apparatus 100 is not being placed in a horizontal position (NO in S38), the notification permission determining section 35 determines that audio notification of the information is not to be provided to the user (S37). After S37, the process in S34 and the subsequent process(es) are repeated.

In both a case where the brightness change amount detecting section 31 determines that the detected amount of change in the brightness is not less than the predetermined amount L3 (YES in S36) and a case where the horizontality determining section 33 determines that the electronic apparatus 100 is being placed in a horizontal position (YES in S38), the notification permission determining section 35 determines that audio notification of the information is to be provided to the user (S39). After S39, a notification section 36 (i) selects, from among speech information 19a stored in a storage section 19, the information of which notification is to be provided to the user, (ii) causes an audio output section 18 to output the selected information in the form of audio, and (iii) causes a display screen of a display section 17 to display the selected information.

Thus, in a case where an area surrounding the electronic apparatus 100 does not become quickly bright or a case where the electronic apparatus 100 is not being placed in a horizontal position, the control device 1 determines that audio notification of the information is not to be provided to the user even in both a state where the brightness in the area around the electronic apparatus 100 is equal to or higher than the predetermined brightness and a state where no predetermined motion is being given to the electronic apparatus 100. For example, while the user is taking a rest (sleeping) in a dark room with the electronic apparatus 100 placed on a bedside table or the like, the control device 1 determines that audio notification of the information is not to be provided to the user until the area surrounding the electronic apparatus 100 becomes quickly bright. Specifically, in a case where the area surrounding the electronic apparatus 100 becomes gradually bright as the sun rises, the control device 1 determines that audio notification of the information is not to be provided to the user. The control device 1 thus can prevent audio notification of information from being provided to the user in a situation for which the user considers it inappropriate to receive audio notification of information. Consequently, the user can take a rest without being hampered by audio notification made by the electronic apparatus 100.

Meanwhile, the control device 1 determines that audio notification of the information is to be provided to the user in either a case where a closed curtain is opened or a case where a light of the room is turned on while the user is taking a rest (sleeping) in the dark room with the electronic apparatus 100 placed on the bedside table or the like. The control device 1 thus can notify the user of the information via audio in a situation for which the user considers it appropriate to receive audio notification of information.

Modification 1

The horizontality determining process in S38 illustrated in FIG. 4 can be replaced with another process. For example, a control device 1 in accordance with Modification 1 of Embodiment 3 is configured to include a user's usage determining section 32 in place of the horizontally determining section 33 included in the control device 1 in accordance with Embodiment 3 (see FIG. 1). With this configuration, S38 in FIG. 4 is a process in which the user's usage determining section 32 determines whether or not an electronic apparatus 100 is being used by a user.

In a case where the user's usage determining section 32 determines that the electronic apparatus 100 is being used by the user, a notification permission determining section 35 determines that audio notification of information is not to be provided to the user (S37). Meanwhile, in a case where the user's usage determining section 32 determines that the electronic apparatus 100 is not being used by the user, the notification permission determining section 35 determines that audio notification of the information is to be provided to the user (S39).

This allows the user who is using the electronic apparatus 100 to continuously use the electronic apparatus 100 without being hampered by audio notification made by the electronic apparatus 100.

Modification 2

For example, a control device 1 in accordance with Modification 2 of Embodiment 3 is configured to include a movement detecting section 34 in place of the horizontally determining section 33 included in the control device 1 in accordance with Embodiment 3 (see FIG. 1). With this configuration, S38 in FIG. 4 is a process in which the movement detecting section 34 detects that a user is moving by a means of transportation which the user uses to move. Note that the means of transportation is, for example, walk, train, bus, bicycle, private car, ship, or airplane.

In a case where the movement detecting section 34 detects that the user is moving by the means of transportation, a notification permission determining section 35 determines that audio notification of information is not to be provided to the user (S37). Meanwhile, in a case where the movement detecting section 34 does not detect that the user is moving by the means of transportation, the notification permission determining section 35 determines that audio notification of information is to be provided to the user (S39).

This allows the control device 1 to prevent audio notification of information from being provided to the user who is moving by the means of transportation.

[Activation of Host Control Section 3]

The host control section 3 changes to the sleep state as needed so that the electronic apparatus 100 reduces power consumption. In a case where the host control section 3 is in the sleep state, no electric power is supplied to the second circuit which constitutes the host control section 3 and which can carry out at least a notification permission determining process performed by the notification permission determining section 35. While the host control section 3 is in the sleep state, the detection section 2 is in the activated state. In a case where no electric power is being supplied to the second circuit, electric power is being supplied to the first circuit which can carry out (i) a motion detecting process performed by the motion detecting section 22 included in the detection section 2 and (ii) a brightness detecting process performed by the brightness detecting section 21 included in the detection section 2. The first circuit causes the second circuit to start the notification permission determining process (causes electric power to start being supplied to the second circuit) in both a case where it is not detected in the motion detecting process that the predetermined motion is being given to the electronic apparatus 100 and a case where it is detected in the brightness detecting process that the brightness in the area around the electronic apparatus 100 is equal to or higher than the predetermined brightness.

(a) of FIG. 5 is a view illustrating a comparative example of a timing at which the host control section 3 returns from the sleep state to the activated state. In a case of (a) of FIG. 5, the host control section 3 is configured to return from the sleep state to the activated state after the horizontality determining process (in a case of YES in S38 of FIG. 4). Note that with this configuration, the horizontality determining section 33 illustrated in FIG. 1 is assumed to be included in the detection section 2. As illustrated in (a) of FIG. 5, in a case where the host control section 3 is in the sleep state, the detection section 2 is in the activated state, and the detection section 2 collects, at regular time intervals, pieces of information supplied from the various sensors 11 through 16. In the detection section 2 carried out are a stationarity determining process (S31 in FIG. 4) through the horizontality determining process (S38 in FIG. 4). After the horizontality determining process (in the case of YES in S38 of FIG. 4), (i) the host control section 3 returns from the sleep state to the activated state, (ii) the speech application program is executed, and (iii) the electronic apparatus 100 starts speaking.

The timing, illustrated in (a) of FIG. 5, at which the host control section 3 is activated, however, may extend a response time A from a time to when the brightness in the area surrounding the electronic apparatus 100 reaches the predetermined brightness (YES in S35 of FIG. 4) to when the electronic apparatus 100 starts speaking (S39 in FIG. 4), as illustrated in (a) of FIG. 5. This can give a user a sense of discomfort.

This problem can be solved by moving forward the timing at which the host control section 3 returns from the sleep state to the activated state. (b) of FIG. 5 illustrates an example of a timing which is applied to the control device 1 in accordance with the present embodiment and at which the host control section 3 returns from the sleep state to the activated state. In a case of (b) of FIG. 5, the host control section 3 is configured to return from the sleep state to the activated state in a case where the brightness detected by the illuminance sensor 13 is at or above the illuminance level of 8 indicative of being sufficiently bright (in the case of YES in S35 of FIG. 4). Note that with this configuration, the horizontality determining section 33 is assumed to be included in the host control section 3, as illustrated in FIG. 1.

As illustrated in (b) of FIG. 5, in a case where the host control section 3 is in the sleep state, the detection section 2 is in the activated state, and the detection section 2 collects, at regular time intervals, the pieces of information supplied from the various sensors 11 through 16. In the detection section 2 carried out are the stationarity determining process (S31 in FIG. 4) through a process of determining that the brightness is at or above the illuminance level of 8 (S35 in FIG. 4). After the brightness detecting section 21 determines that the brightness detected by the illuminance sensor 13 is at or above the illuminance level of 8 (in the case of YES in S35 of FIG. 4), (i) the host control section 3 returns from the sleep state to the activated state, and (ii) a brightness tendency determining process (S36 in FIG. 4) through the horizontality determining process (S38 in FIG. 4) are carried out in the host control section 3. After the horizontality determining process (in the case of YES in S38 of FIG. 4), the speech application program is executed, and the electronic apparatus 100 starts speaking.

In a case of the timing, illustrated in (b) of FIG. 5, at which the host control section 3 is activated, a response time B from a time to when the brightness in the area surrounding the electronic apparatus 100 reaches the predetermined brightness to when the electronic apparatus 100 starts speaking is shorter than the response time A illustrated in (a) of FIG. 5. This is because in the host control section 3, determination processes are carried out on the basis of detection results supplied from the various sensors 11 through 16 (without providing regular time intervals) whereas in the detection section 2, determination processes are carried out at regular time intervals. In the case of the timing, illustrated in (b) of FIG. 5, at which the host control section 3 is activated, it is therefore possible to prevent the electronic apparatus 100 from giving a user a sense of discomfort in terms of a timing at which the electronic apparatus 100 starts speaking as well as possible to reduce power consumption of the electronic apparatus 100.

(c) of FIG. 5 is a view illustrating an example of how the brightness detected by the illuminance sensor 13 changes over time. The brightness detecting section 21 compares the brightness detected by the illuminance sensor 13 with the illuminance level L1 of 6 and the illuminance level L2 of 8, both of which are the determination reference values, so that the brightness detecting section 21 detects that the brightness in the area around the electronic apparatus 100 is equal to or higher than the predetermined brightness. Thereafter, the brightness change amount detecting section 31 detects an amount of change in the brightness in the area around the electronic apparatus 100 during a predetermined period of time. For example, as illustrated in (c) of FIG. 5, in a case where the amount of change in the brightness during a period of time from $t_n$ to $t_{n+1}$ is less than a predetermined amount, the notification permission determining section 35 determines that audio notification of information is not to be provided to a user. The period of time from $t_n$ to $t_{n+1}$ can be, for example, one cycle of detection performed by the brightness change amount detecting section 31, or a given fixed value.

[Software Implementation Example]

Control blocks (particularly, the detection section 2 and the host control section 3) of the control device 1 each can be realized by a logic circuit (hardware) provided in an integrated circuit (IC chip) or the like or can be alternatively realized by software as executed by a central processing unit (CPU).

In the latter case, the control device 1 includes: a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recapitulation]

A control device (1) in accordance with Aspect 1 of the present invention is a control device which controls providing visual or audio notification of information to a user, including: a motion detecting section (22) which detects whether or not a predetermined motion is being given to an electronic apparatus (100) which includes the control device; a brightness detecting section (21) which detects whether or not a brightness in an area around the electronic apparatus is equal to or higher than a predetermined brightness; and a notification permission determining section (35) which determines, in a case where the brightness detecting section detects that the brightness in the area around the electronic apparatus is equal to or higher than the predetermined brightness, whether or not to permit providing notification of the information to the user, in a case where the motion detecting section detects that the predetermined motion is being given to the electronic apparatus, the notification permission determining section determining that notification of the information is not to be provided to the user.

With the configuration, in a case where the predetermined motion is being given to the electronic apparatus, the control device determines that notification of the information is not to be provided to the user even in a state where the brightness in the area around the electronic apparatus is equal to or higher than the predetermined brightness. The case where the predetermined motion is being given to the electronic apparatus is a situation where the user does not want to be notified of the information. Examples of such a situation include (i) a situation where the user takes the electronic apparatus out of a bag or a pocket, (ii) a situation where the user turns right side up the electronic apparatus which has been placed with a display screen, which displays information such as an image, facing downward, and (iii) a situation where the user lifts up the electronic apparatus which is placed on a given place. The control device thus can prevent audio notification of the information from being provided to the user in a situation for which the user considers it inappropriate to receive audio notification of information. The control device can also prevent private information of the user, such as his/her liking and his/her attribute, from becoming known to a person around the user, that is, can prevent the leakage of the user's privacy.

In Aspect 2 of the present invention, a control device is configured such that, in Aspect 1 of the present invention, in the case where the motion detecting section detects that the predetermined motion is being given to the electronic apparatus, the notification permission determining section causes the brightness detecting section to stop detecting whether or not the brightness in the area around the electronic apparatus is equal to or higher than the predetermined brightness.

With the configuration, while the motion detecting section detects that the predetermined motion is being given to the electronic apparatus, the notification permission determining section (i) determines that notification of the information is not to be provided to the user, and (ii) causes the brightness detecting section to stop carrying out a detection process. Once the brightness detecting section stops carrying out the detection process, the notification permission determining section does not need to determine whether or not to permit providing notification of the information to the user. Accordingly, the notification permission determining section does not determine that notification of the information is to be provided to the user. Consequently, the control device can prevent notification of the information from being provided to the user in a situation for which the user considers it inappropriate to receive notification of information.

In Aspect 3 of the present invention, a control device is configured such that, in Aspect 1 or 2 of the present invention, the control device further includes a user's usage determining section which determines whether or not the electronic apparatus is being used by the user, in a case where the user's usage determining section determines that the electronic apparatus is being used by the user, the notification permission determining section determining that notification of the information is not to be provided to the user. The configuration allows the user who is using the electronic apparatus to continuously use the electronic apparatus without being hampered by the information of which the electronic apparatus notifies the user.

In Aspect 4 of the present invention, a control device is configured such that, in any one of Aspects 1 through 3 of the present invention, the control device further includes a brightness change amount detecting section (31) which, in the case where the brightness detecting section detects that the brightness in the area around the electronic apparatus is equal to or higher than the predetermined brightness, detects an amount of change in the brightness in the area around the electronic apparatus during a predetermined period of time, in a case where the amount of change in the brightness detected by the brightness change amount detecting section is less than a predetermined amount, the notification permission determining section determining that notification of the information is not to be provided to the user.

With the configuration, in the case where the amount of change in the brightness detected by the brightness change amount detecting section is less than the predetermined amount, the notification permission determining section determines that notification of the information is not to be provided to the user. The case where the amount of change in the brightness detected by the brightness change amount detecting section is less than the predetermined amount is (i) a case where an area surrounding the electronic apparatus does not become quickly bright (for example, a case of sunrise), and (ii) a situation where the user does not want to be notified of the information. The control device thus can prevent the information from being presented to the user in a situation for which the user considers it inappropriate to receive notification of information (in a situation where the user is sleeping).

In Aspect 5 of the present invention, a control device is configured such that, in any one of Aspects 1 through 4 of the present invention, the control device further includes a horizontality determining section (33) which determines whether or not the electronic apparatus is being placed in a horizontal position, in a case where the horizontality determining section determines that the electronic apparatus is not being placed in a horizontal position, the notification permission determining section determining that notification of the information is not to be provided to the user.

With the configuration, in the case where the horizontality determining section determines that the electronic apparatus is not being placed in the horizontal position, the notification permission determining section determines that notification of the information is not to be provided to the user. A case where the electronic apparatus is not being placed in a horizontal position is, for example, (i) a case where the electronic apparatus is not being placed on a desk or the like by the user but in an unstable state, and (ii) a case where it is assumed that the electronic apparatus is being used by the user. In this case, the control device determines that notification of the information is not to be provided to the user even in both a state where the brightness in the area around the electronic apparatus is equal to or higher than the predetermined brightness and a state where no predetermined motion is being given to the electronic apparatus. This allows the control device to prevent notification of information from being provided to the user in a situation for which the user considers it inappropriate to receive notification of information.

In Aspect 6 of the present invention, a control device is configured such that, in any one of Aspects 1 through 5 of the present invention, the control device further includes a movement detecting section (34) which detects that the user is moving by a means of transportation which the user uses to move, in a case where the movement detecting section detects that the user is moving by the means of transportation, the notification permission determining section determining that notification of the information is not to be provided to the user.

With the configuration, in the case where the movement detecting section detects that the user is moving by the means of transportation (walk, train, bus, bicycle, private car, ship, airplane or the like), the notification permission determining section determines that notification of the information is not to be provided to the user. The control device thus can prevent notification of the information from being provided to the user in a case where the user is moving by the means of transportation.

In Aspect 7 of the present invention, an electronic apparatus (100) is configured to include a control device in accordance with any one of Aspects 1 through 6. The configuration brings about an effect identical to that brought about by any one of Aspects 1 through 6.

In Aspect 8 of the present invention, an electronic apparatus is configured such that, in Aspect 7 of the present invention, the electronic apparatus includes: a first circuit which is capable of carrying out a motion detecting process performed by the motion detecting section and a brightness detecting process performed by the brightness detecting section; and a second circuit which is capable of carrying out a notification permission determining process performed by the notification permission determining section, the first circuit causing the second circuit to start carrying out the notification permission determining process in both a case where it is not detected in the motion detecting process that the predetermined motion is being given to the electronic apparatus and a case where it is detected in the brightness detecting process that the brightness in the area around the electronic apparatus is equal to or higher than the predetermined brightness.

With the configuration, the first circuit causes the second circuit to start carrying out the notification permission determining process in both the case where it is not detected in the motion detecting process that the predetermined motion is being given to the electronic apparatus and the case where it is detected in the brightness detecting process that the brightness in the area around the electronic apparatus is equal to or higher than the predetermined brightness. This makes it possible to start the notification permission determining process at a proper timing as well as reduce power consumption of the electronic apparatus (the second circuit). Consequently, it is possible to prevent a sense of discomfort from being given to the user in terms of a timing at which notification of the information is provided to the user.

The control device in accordance with each Aspect of the present invention can be realized by a computer. In this case, the present invention also encompasses (i) a control program, of the control device, for causing the computer to operate as each of the sections (software elements) which are included in the control device so that the control device is realized by the computer and (ii) a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: control device
2: detection section
21: brightness detecting section
22: motion detecting section
3: host control section
31: brightness change amount detecting section
32: user's usage determining section
33: horizontality determining section
34: movement detecting section
35: notification permission determining section
36: notification section
100: electronic apparatus

The invention claimed is:

1. A control device which controls providing visual or audio notification of information to a user, comprising:
   a motion detecting section which detects whether or not a predetermined motion is being given to an electronic apparatus which includes the control device;
   a brightness detecting section which detects whether or not a brightness in an area around the electronic apparatus is equal to or higher than a predetermined brightness; and
   a notification permission determining section which determines, in a case where the brightness detecting section detects that the brightness in the area around the electronic apparatus is equal to or higher than the predetermined brightness, whether or not to permit providing notification of the information to the user,
   in a case where the motion detecting section detects that the predetermined motion is being given to the electronic apparatus, the notification permission determining section determining that notification of the information is not to be provided to the user.

2. The control device as set forth in claim 1, wherein in the case where the motion detecting section detects that the predetermined motion is being given to the electronic apparatus, the notification permission determining section causes the brightness detecting section to stop detecting whether or not the brightness in the area around the electronic apparatus is equal to or higher than the predetermined brightness.

3. The control device as set forth in claim 1, further comprising a user's usage determining section which determines whether or not the electronic apparatus is being used by the user,
   in a case where the user's usage determining section determines that the electronic apparatus is being used by the user, the notification permission determining section determining that notification of the information is not to be provided to the user.

4. The control device as set forth in claim 1, further comprising a brightness change amount detecting section which, in the case where the brightness detecting section detects that the brightness in the area around the electronic apparatus is equal to or higher than the predetermined brightness, detects an amount of change in the brightness in the area around the electronic apparatus during a predetermined period of time,
   in a case where the amount of change in the brightness detected by the brightness change amount detecting section is less than a predetermined amount, the notification permission determining section determining that notification of the information is not to be provided to the user.

5. The control device as set forth in claim 1, further comprising a horizontality determining section which determines whether or not the electronic apparatus is being placed in a horizontal position,
   in a case where the horizontality determining section determines that the electronic apparatus is not being placed in a horizontal position, the notification permission determining section determining that notification of the information is not to be provided to the user.

6. The control device as set forth in claim 1, further comprising a movement detecting section which detects that the user is moving by a means of transportation which the user uses to move,
   in a case where the movement detecting section detects that the user is moving by the means of transportation, the notification permission determining section determining that notification of the information is not to be provided to the user.

7. An electronic apparatus which includes a control device recited in claim 1.

8. The electronic apparatus as set forth in claim 7, comprising:
   a first circuit which is capable of carrying out a motion detecting process performed by the motion detecting section and a brightness detecting process performed by the brightness detecting section; and
   a second circuit which is capable of carrying out a notification permission determining process performed by the notification permission determining section, the first circuit causing the second circuit to start carrying out the notification permission determining process in both a case where it is not detected in the motion detecting process that the predetermined motion is being given to the electronic apparatus and a case where it is detected in the brightness detecting process that the brightness in the area around the electronic apparatus is equal to or higher than the predetermined brightness.

9. A non-transitory computer-readable storage medium which stores a control program for causing a computer to function as a control device recited in claim 1, the control program causing the computer to function as the motion detecting section, the brightness detecting section and the notification permission determining section.

* * * * *